US008336857B2

(12) United States Patent
Davis

(10) Patent No.: US 8,336,857 B2
(45) Date of Patent: Dec. 25, 2012

(54) METHOD AND APPARATUS FOR PULLING HOSE

(76) Inventor: Rufus Davis, Robeline, LA (US)

( * ) Notice: Subject to any disclaimer, the term of this patent is extended or adjusted under 35 U.S.C. 154(b) by 195 days.

(21) Appl. No.: 12/397,119

(22) Filed: Mar. 3, 2009

(65) Prior Publication Data

US 2009/0165226 A1 Jul. 2, 2009

Related U.S. Application Data

(63) Continuation of application No. 10/885,350, filed on Jul. 6, 2004, now abandoned.

(60) Provisional application No. 60/484,829, filed on Jul. 3, 2003.

(51) Int. Cl.
*H02G 1/08* (2006.01)

(52) U.S. Cl. ........................ 254/134.3 FT; 254/134.3 R

(58) Field of Classification Search .......... 254/134.3 FT
See application file for complete search history.

(56) References Cited

U.S. PATENT DOCUMENTS 2,819,481 A 1/1958 Lockert
3,343,739 A 9/1967 Kinnan
3,628,728 A 12/1971 Polutnik et al.
3,713,301 A * 1/1973 Bryant .......................... 405/177
3,805,462 A 4/1974 Caperton
4,015,447 A * 4/1977 Philip .......................... 66/132 T
4,199,837 A 4/1980 Fisco, Jr.
4,228,990 A 10/1980 Horvath
4,234,980 A 11/1980 DiVito et al.
4,537,136 A 8/1985 Douglas et al.
4,602,659 A 7/1986 Parkyn, Sr.
4,644,791 A * 2/1987 Sonoda et al. ............... 73/866.5
4,896,686 A 1/1990 Schmidt, Jr. et al.
4,993,443 A * 2/1991 Buchert .................... 134/167 C
5,139,751 A * 8/1992 Mansfield et al. ............ 422/292
5,333,969 A 8/1994 Blaha et al.
5,435,854 A 7/1995 Derlein
5,636,648 A 6/1997 O'Brien et al.
5,740,821 A 4/1998 Arnold
6,073,916 A * 6/2000 Plummer ............... 254/134.3 R
6,111,600 A 8/2000 McLeod et al.

(Continued)

OTHER PUBLICATIONS

International Preliminary Report on Patentability issued Nov. 1, 2010 during prosecution of International Patent Application No. PCT/US04/2155.

(Continued)

*Primary Examiner* — Lee D Wilson
*Assistant Examiner* — Shantese McDonald
(74) *Attorney, Agent, or Firm* — Fulbright & Jaworski, LLP

(57) ABSTRACT

A hose puller that includes puller wheels that are motorized and configured to grip, among other things, a high pressure water hose. The hose puller further includes an idler wheel that is positioned to oppose the puller wheels. The idler wheel is spring loaded to help ensure that the hose maintains frictional relation with the puller wheels. Alternatively, the hose puller may have puller wheels shaped to grip a high pressure water hose. The hose puller also includes a camera that is configured to show images that enable the operator to control the hose puller from a remote location.

11 Claims, 4 Drawing Sheets

U.S. PATENT DOCUMENTS

| | | | | |
|---|---|---|---|---|
| 6,138,697 | A | 10/2000 | Horger et al. | |
| 6,193,218 | B1 | 2/2001 | Philyaw | |
| 6,195,861 | B1 | 3/2001 | Frye et al. | |
| 6,237,177 | B1 | 5/2001 | Richardson | |
| 6,294,084 | B1 | 9/2001 | Henkin et al. | |
| 6,349,653 | B1 | 2/2002 | Siedlarczyk | |
| 6,402,122 | B2 | 6/2002 | Mayr et al. | |
| 6,672,394 | B2 | 1/2004 | Neal | |
| 6,887,014 | B2 | 5/2005 | Holland et al. | |
| 6,958,767 | B2 | 10/2005 | Olsson et al. | |
| 7,007,761 | B1 | 3/2006 | Johnson, IV | |
| 2003/0108391 | A1 | 6/2003 | Essay | |
| 2003/0182754 | A1 | 10/2003 | O'Brien | |
| 2005/0000546 | A1 | 1/2005 | Davis | |
| 2005/0204979 | A1 * | 9/2005 | Marcangelo | 112/475.08 |

OTHER PUBLICATIONS

Brzozowski-Garner, Carol, *The Weird and the Wonderful, Cleaner*™ , For residential, municipal and industrial cleaning contractors, Sep. 2002, pp. 28-29, www.cleaner.com.

Cobra Technologies, Pipeline Video Inspection Equipment & Software Solutions, Sep. 2002, p. 35, www.cleaner.com.

WMI Innovation in Industrial Equipment, Easement Machine, Tracked Power Carrier, www.wmitsh.com.

Envirosight, Rovver System Mounted on ATV, Rovver system crawler.

International Preliminary Report on Patentability issued Nov. 1, 2010 during prosecution of International Patent Application No. PCT/US04/21555.

* cited by examiner

METHOD AND APPARATUS FOR PULLING HOSE

CROSS-REFERENCE TO RELATED APPLICATIONS

This application claims priority to Non-Provisional Application Ser. No. 10/885,350, filed Jul. 6, 2004, which claimed the benefit of Provisional Application No. 60/484,829, filed Jul. 7, 2003, now expired, the contents of both applications are incorporated herein by reference in their entirety.

TECHNICAL FIELD

The present invention discloses a novel apparatus adapted to be positioned near a manhole and for pulling the water hoses used for cleaning sewer lines. This invention also relates to a method of using the disclosed portable hose puller. Although the hose puller is described in the context of cleaning sewer lines, one skilled in the art readily understands that the disclosed portable hose puller and method for using the portable hose puller may be used in a wide variety of applications that require hose, rope, electrical cord, or similar application.

BRIEF SUMMARY OF THE INVENTION

One embodiment of the present invention is directed to a portable hose puller comprising a frame; a pair of handle bars connected to the frame; a pair of ground wheels connected to the frame; a pair of puller wheels connected to the frame, wherein the puller wheel are operably positioned with respect to each other to grip a hose; an idler wheel operably located with respect to the puller wheels; and a motor connected to the puller wheels. The puller wheels are configured to have gripping surfaces, which may be made of rubber. Further, the puller wheels may be rounded.

The hose puller may further include an idler wheel is spring loaded to secure a hose in frictional association with the gripping surface of the puller wheels. The hose puller may also include a clutch that is connected to the puller wheels.

The hose puller may further include a control panel for controlling the speed of the motor.

The hose puller may further include a camera positioned with respect to the puller wheels to capture images of hose puller in operation.

The hose puller may further include a control panel for controlling the hose puller.

The hose puller may further include an upper and lower hose guide connected to the frame.

A further embodiment of the disclosed portable hose puller includes a hose puller comprising, a frame; a pair of handle bars connected to the frame; a pair of ground wheels connected to the frame; an upper puller wheel and a lower puller wheel connected to the frame, wherein the puller wheel are operably positioned with respect to each other to grip a hose; and a motor operably connected to the puller wheels. The hose puller may include puller wheels that are shaped to receive a hose. The puller wheels may be rubber. Further, the puller wheels may be shaped to grip a hose.

The hose puller may further comprise a chain connecting the puller wheels to the engine. The puller wheels are configured with a sprocket for receiving said chain. Further, the puller wheels and sprockets are sized such that puller wheels are traveling at the same rate.

The hose puller may further comprise a tensioning wheel to maintain tension in the chain.

The hose puller may further comprise a clutch operably connected to the motor and puller wheels.

The hose puller may further comprise a control panel configured to control the speed of the motor. The hose puller may also be configured to be controlled remotely.

The hose puller may further comprise comprises a camera positioned with respect to the puller wheels to capture images of hose puller in operation.

The hose puller may further comprise an upper and lower hose guide connected to the frame.

A further embodiment of the disclosed invention includes a method of using a hose puller comprising the steps of positioning a hose puller with respect to a manhole; running a hose from a water source to the hose puller; and gripping the hose with hose puller wheels.

The method further includes the steps of connecting the hose puller to an electrical power source and positioning the hose in frictional engagement with the hose puller.

The method further includes the step of engaging the hose puller to feed the hose into a manhole.

The method further includes the step of the step of positioning a camera to view the hose as it is fed into the manhole.

The method further includes the step of comprising the step of connecting a cleaning nozzle to the end of the hose.

The method further includes the step of feeding the cleaning nozzle and hose into a portion of pipe to be cleaned.

The method further includes the step of feeding the hose into the pipe using the hose puller and the cleaning nozzle.

The method may further include the step of remotely monitoring the speed and progress of the hose.

The method may further include the step of remotely controlling the speed and progress on the hose.

The method may further include the step of retracting the hose.

The method may further include the use of a hose puller comprises a frame; a pair of handle bars connected to the frame; a pair of ground wheels connected to the frame; a pair of puller wheels connected to the frame, wherein the puller wheel are operably positioned with respect to each other to grip a hose; and a motor operably connected to the puller wheels. The puller wheels may have a gripping surface. The gripping surface may be rubber. The gripping surface may also be rounded.

The method may further include the use of a hose puller that includes a clutch operably connected with the motor and puller wheels.

The method may further include the use of a hose puller that includes a control panel configured to control the speed of the motor.

The method may further include the use of a hose puller that includes a camera positioned with respect to the puller wheels to capture images of the hose puller in operation.

The method may further include the use of a hose puller that includes a control panel that can be controlled remotely.

The method may further include the use of a hose puller that includes an upper and lower hose guide connected to the frame.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The advantages, features, and details of the invention are explained in greater detail in the following description of the preferred embodiment, with the aid of drawings as listed below.

For a more complete understanding of the present invention, reference is now made to the following descriptions taken in conjunction with the accompanying drawing, in which.

DETAILED DESCRIPTION OF THE INVENTION

Upon review of the detailed description and the accompanying drawings provided herein, it will be apparent to one of ordinary skill in the art that a portable hose puller may be used in a wide array of applications that require maneuvering of hoses or the like. Accordingly, the present invention shall not be limited to the structures and methods specifically described and illustrated herein, although the following description is particularly directed to a portable hose puller for use in sewer cleaning operations. The term “hose” with which the present invention is associated, includes various types of hoses, tubes, ropes, cables, chains, and the like. The term “portable” with which the present invention is associated describes an apparatus sized to be moved by one person. Further, the hose puller is light enough that it does not damage soft ground while being positioned. Portability makes the disclosed apparatus uniquely suited to be positioned near a work site. However, it is contemplated that the disclosed apparatus may be scaled for a particular application. For example, in large cable laying applications, the disclosed devise may be scaled to handle the increased loads associated with such applications.

Figure 1:
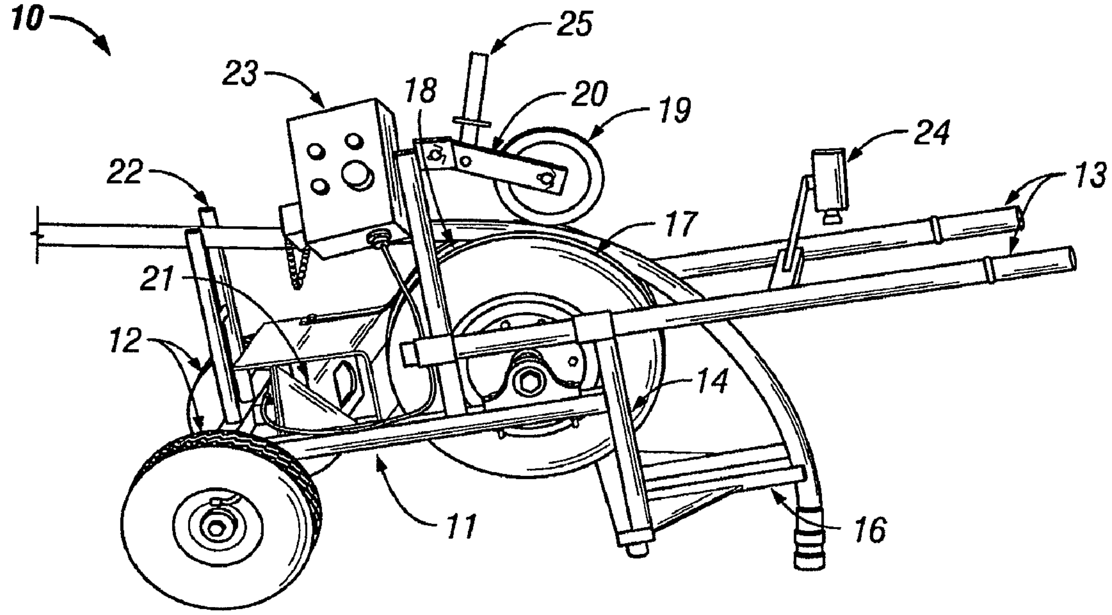
FIG. 1 is a portable hose puller.
Figure 2:
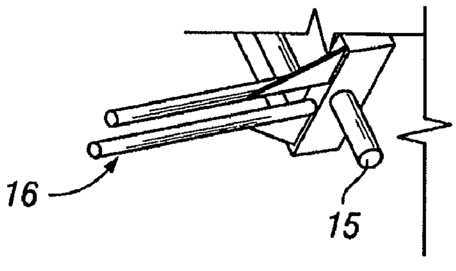
FIG. 2 is the lower portion of the stand arms configured to seat inside a manhole.

FIG. 1 shows one aspect of portable hose puller 10. The hose puller includes a frame 11, which may be of metal, aluminum, plastic, or combinations thereof. The metal frame is configured with handles 13 and wheels 12 to allow for easy mobility. Handles 13 may be telescoping to provide greater leverage when moving the portable hose puller. Frame 11 is also configured with stand arms 14. The lower portion of stand arms 14 include a gripping shape 15. For grass and other soft surfaces, the gripping shape may be shovel shaped to dig into soft surfaces. However, it is readily understood that many different shapes may be used for different applications. For example, it is contemplated that rubber stoppers may also be used in some applications. The essential characteristic of all gripping shapes, however, is that they inhibit the movement of the hose puller 10 when it is in use. FIG. 2 shows a detailed view of the gripping shape 15 that is shaped to rest inside a manhole opening.

Also included on stand arms 14 are forward guide arms 16. The forward guide arms 16 are sized to keep the hose in guided relation with the gripper wheels 17. The forward guide arms 16 are shown as two separate extensions, which allows the hose to be easily fed into the gripper wheels 17. However, it is contemplated that the arms may be connected to enclose the area in which the hose is located. It is further contemplated that the guide arms may be configured with rollers to reduce the friction between the hose and the forward guide arms 16, alternatively, the forward guide arms 16 may include a material, such as Teflon, to reduce the friction between the hose and the forward guide arms. The guide arms are shown attached to stand arms 14. However, it is readily understood that the guide arms may extend from handles 13, extend from stand arms 14 to handles 13, extend from some other frame element, or any combination thereof.

Figure 3:
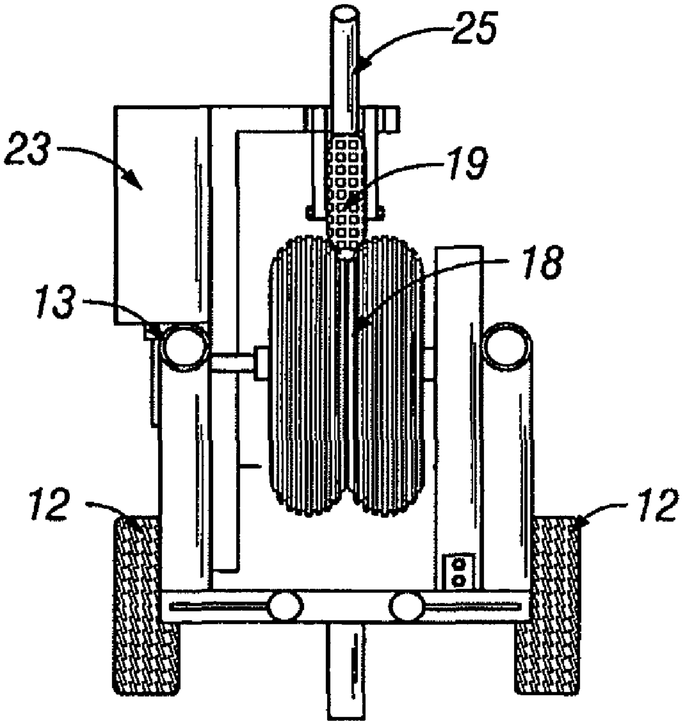
FIG. 3 is the front of the hose puller showing the friction groove.
Figure 4:
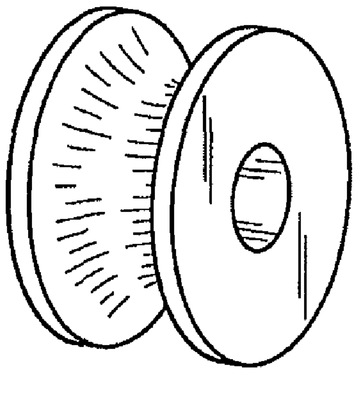
FIG. 4 is a wheel specially shaped to grip hose.

Attached to the hose puller frame 11 are puller wheels 17. The puller wheels 17 are made from a soft material such as rubber. Although rubber is disclosed, one skilled in the art understands that any soft compound may be used. Additionally, the puller wheels 17 may be air filled. The puller wheels 17 are positioned to create a friction groove 18 between the wheels. FIG. 3 shows a front view of the hose puller to show the friction groove 18. The puller wheels 17 are shown positioned side by side in a parallel configuration. In such a configuration, the curvature of the wheels form the side walls of the friction groove. Although a parallel positioning of puller wheels 17 is disclosed, it is contemplated that the space between the wheels may be adjusted to create a deeper groove. It is also contemplated that the angle between the wheels may be adjusted to change the depth of the friction groove 18. Puller wheels 17 are connected to drive motor 21. The drive motor 21 rotates the puller wheels 17 when power is applied. Alternatively, the frictional groove can be created by a single wheel 17'. FIG. 4 shows a wheel shaped for a frictional groove. The shaped wheel 17' may be made out of any suitable material. The wheel shown in FIG. 4 is made out of aluminum. The puller wheels 17 are positioned relative to the man hole such that the weight of the hose pulls the hose into greater frictional engagement with the puller wheels 17.

Attached to the hose puller frame 11 is an idler wheel 19 and idler wheel frame 20. The idler wheel is configured to ensure that the hose being manipulated by the hose puller is maintained in frictional engagement with the frictional groove 18. Like the puller wheels 17, the idler wheel is made out of a soft material such as rubber or the like. The idler wheel may also be filled with air. Although the idler wheel 19 is shown a different size than the puller wheels 17, it is understood that the idler wheel may be sized to suit a particular purpose. Additionally, the idler wheel may be any number of different shapes. For example, the idler wheel may actually be a flat surface that functions to keep the hose in frictional engagement with the puller wheels 17. Alternatively, the idler wheel 19 may be shaped to complement the puller wheel 17 shown in FIG. 4.

The disclosed hose puller is adapted to take advantage of the frictional force associated with redirecting a hose as it is being manipulated. For example, in the configuration shown, the hose is realigned from an orientation that is parallel to the surface to one that is perpendicular to the surface. Such realignment naturally seats the hose in the frictional groove. However, in other applications or in applications requiring greater frictional force, the idler wheel frame may be adapted to provide additional force to help seat the hose in the frictional groove. Additionally, the hose puller may be configured with multiple wheels 17. In such a configuration the wheels are positioned to redirected the hose as it passes over each pair of wheels 17. Redirecting the hose acts to increases the gripping friction provided by the gripping groove. A configuration with multiple sets of puller wheels is particularly adapted for straight line pulling applications where the hose direction is not changed as it passes through the hose puller 10. One skilled in the art understands that the relationship between the puller wheels 17 can be changed to further increase the frictional forces. For example, all three puller wheels can be positioned in alignment to increase the amount of bend in the hose as it passes over each wheel.

The idler wheel 19 shown in FIG. 1 is attached to the idler wheel frame 20. The idler wheel frame 20 may be selectively positionable or configured to apply rotational force such that the idler wheel 19 applies pressure to the puller wheels 17. The rotational force may be the result of a spring or may be driven by some other means, such as pneumatically. Further, the spring tension can be adjusted using spring handle 25.

The puller frame 11 includes aft guide arms 22. The aft guide arms function similarly to the forward guide arms 16 and may be similarly shaped and configured.

The hose puller 10 may be controlled using control panel 23 or by remote control (not shown).

The hose puller 10 may also be configured with a camera 24. The camera is positioned to capture images of the hose as it is feed into or retrieved from a sewer line. The camera may also be trained on the hose puller or any other aspect of interest. The hose puller may also be configured to view counter 37. The counter 37 records the amount of hose that passes over wheel 17. This information is used by the operator to control how far the cleaning nozzle is inserted into the sewer line. In a normal operation, once the length is established by visual inspection at the downhole manhole, the cleaning nozzle can then make multiple passes through the sewer line without additional visual inspections.

Figure 5:
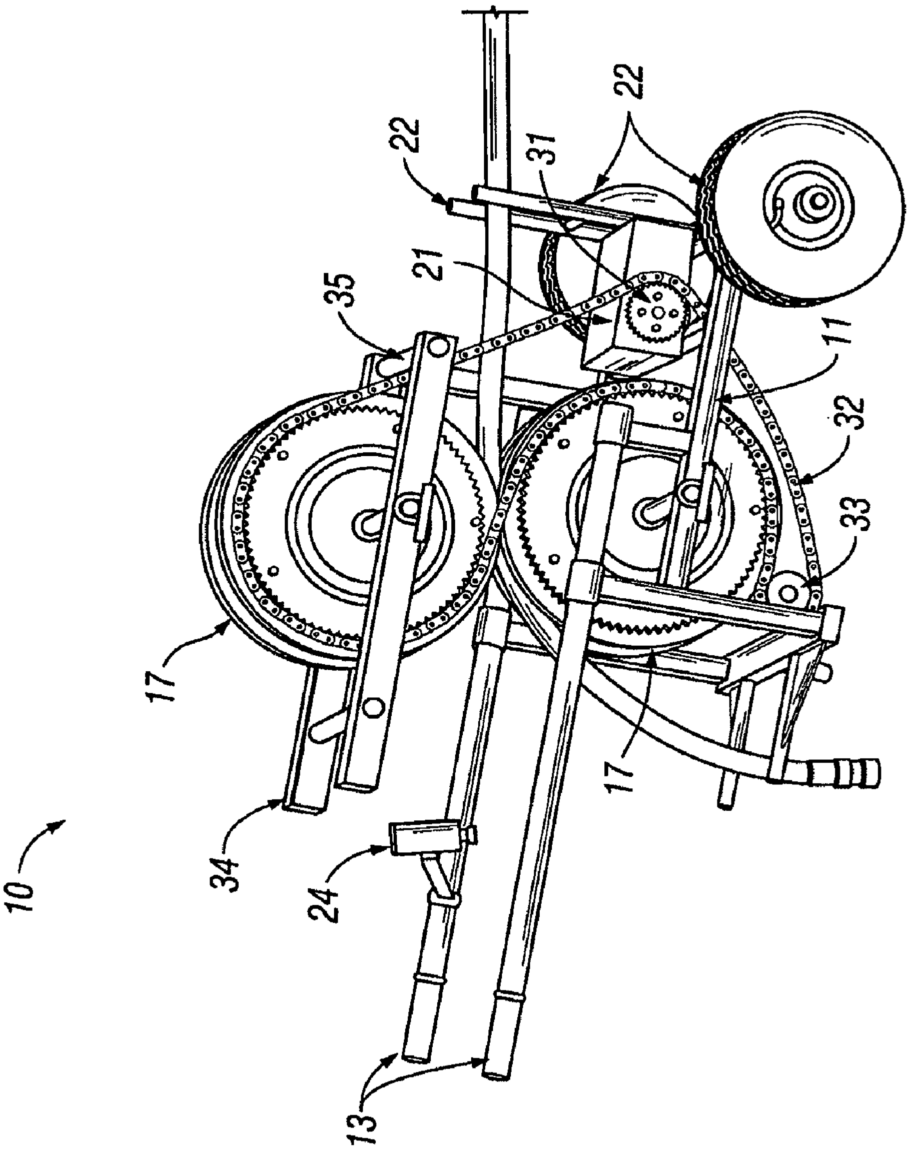
FIG. 5 is a hose puller configured with two puller wheels.

FIG. 5 depicts an alternative configuration in which the hose puller 10 is configured with two puller wheels 17. Both puller wheels 17 are connected with chain 32 to drive motor 21 and drive motor sprocket 31. The hose puller 10 also includes a tensioning wheel 33. The tensioning wheel is designed to regulate the chain tension. The tensioning wheel may be a wheel, sprocket, or the like. The tension may be set manually or adjusted by way of a spring. The hose puller is hinged at point 35 such that different size hoses can be easily inserted into the hose puller. To the extent additional gripping is needed, a weight can be applied to the arm supporting the upper puller wheel 17. Optimally, if a weight is needed, it is applied to the upper arm at end 34. The hose puller configured as shown in FIG. 5 includes a camera and control box. Further, the hose puller of FIG. 5 is configured to be operated remotely. Puller wheels 17 may be made out of a hard rubber or other solid material that is also suited for gripping a hose.

Figure 6:
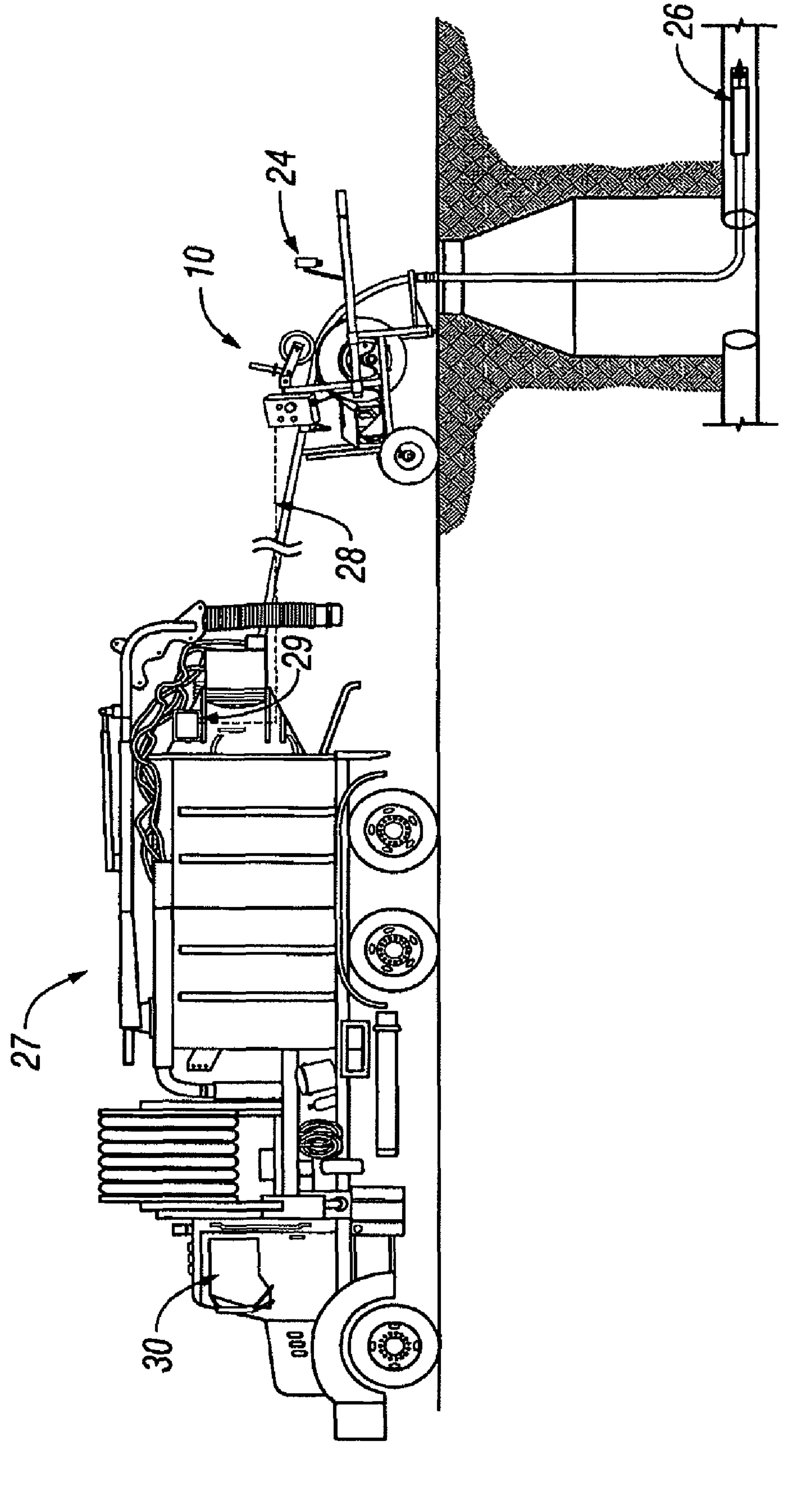
FIG. 6 is a diagram showing the positioning and use of the portable hose puller.

FIG. 6 shows the hose puller positioned over a manhole. The hose puller 10 is shown as it is feeding a hose into a manhole for cleaning head 26. The hose puller is shown connected to cleaning truck 27. The cleaning truck supplies high pressure water to the cleaning head 26. Although the cleaning truck is shown as the source of the water used by cleaning head 26, it is understood that the cleaning truck 27 may be connected to a fire hydrant or other similar water source. Dashed line 28 shows a connection between the cleaning truck 27 and camera. Images from the video camera 24 are displayed on monitor 29. Although the monitor is shown mounted to the back of cleaning truck 27, it is understood that the monitor may also be located in the cab 30. Additionally, FIG. 6 shows the cleaning truck 27 being located in close proximity to the hose puller 10. In reality, the cleaning truck 27 is positioned much further away from the manhole. The hose puller engine may be gas powered or connected via a power line (not shown) to the cleaning truck 27. Additionally, the hose puller is not show to scale. In particular, the hose puller is not scaled relative to cleaning truck 27. In reality, the hose puller is much smaller relative to the cleaning truck.

The present invention is, therefore, well adapted to carry out the objects and attain the ends and the advantages mentioned, as well as others inherent therein. While presently preferred embodiments have been described, numerous changes to the details of construction, arrangement of the article's parts or components, and the steps to the processes may be made. For example, the frame may be reconfigured in a number of different ways. However, all such configurations allow for the frictional groove to provide the primary means whereby the hose puller manipulates hoses. Such changes will readily suggest themselves of those skilled in the art and are encompassed within the spirit of invention and in the scope of the appended claims.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the machine, methods and steps described in the specification. As one will readily appreciate from the disclosure, machines, methods, and steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for cleaning sewer lines comprising,
a portable hose puller comprising:
a frame;
a ground wheel connected to said frame;
a pair of air filled, rubber, hose puller wheels connected to the frame, wherein the puller wheels are operably positioned with respect to each other to form a friction groove, and wherein said pair of puller wheels rotate around the same axis;
a motor mounted to said frame and operably connected to the puller wheels;
a cleaning truck remote from said portable hose puller;
a cleaning hose connected on one end to said cleaning truck and gripped by said portable hose puller; and
a cleaning head attached to said cleaning hose, wherein said cleaning truck supplies water through said cleaning hose to said cleaning head.

2. The system for cleaning sewer lines of claim 1, wherein said portable hose puller further comprises an idler wheel operably located with respect to said puller wheels to help seat said cleaning hose in said friction groove.

3. The system for cleaning sewer lines of claim 2, wherein said idler wheel is spring loaded to help seat said cleaning hose in said friction groove.

4. The system for cleaning sewer lines of claim 2, wherein the idler wheel is positioned to apply pressure to the hose located in the friction groove between the puller wheels.

5. The system for cleaning sewer lines of claim 1, wherein said portable hose puller further comprises a camera positioned with respect to said pair puller wheels to capture images of said portable hose puller in operation.

6. The system for cleaning sewer lines of claim 5, wherein said cleaning truck includes a monitor to display images from said camera.

7. The system for cleaning sewer lines of claim 6, wherein said frame comprises, forward guide arms extending from said frame to guide said cleaning hose into a manhole; and aft guide arms positioned on said frame between said cleaning truck and said pair of puller wheels.

8. The system for cleaning sewer lines of claim 7, further comprising a control panel configured to control the speed of said motor.

9. The system for cleaning sewer lines of claim 8 wherein said motor rotates said pair of puller wheels in a counter-clockwise direction when retrieving said cleaning head.

10. The system for cleaning sewer lines of claim 1, wherein said portable hose puller further comprises a pair of handle bars connected to said frame and wherein said portable hose puller is sized to be moved by hand using said pair of handle bars and said ground wheel.

11. A system for cleaning sewer lines comprising, a portable hose puller comprising:

a frame;

a ground wheel connected to said frame;

a pair of airfilled, rubber, puller wheels connected to the frame, wherein the puller wheels are operably positioned with respect to each other to form a friction groove, and wherein said pair of puller wheels rotate around the same axis;

a motor mounted to said frame and operably connected to the puller wheels;

a cleaning truck remote from said portable hose puller, wherein the cleaning truck is configured to store a cleaning hose;

a cleaning hose connected on one end to said cleaning truck, and gripped by said portable hose puller, wherein the cleaning hose is stored on the cleaning truck; and a cleaning head attached to said cleaning hose, wherein said cleaning truck supplies water through said cleaning hose to said cleaning head.

* * * * *